United States Patent
Lee et al.

(10) Patent No.: US 9,712,803 B2
(45) Date of Patent: Jul. 18, 2017

(54) RECEIVING SYSTEM AND METHOD OF PROCESSING DATA

(71) Applicant: LG Electronics Inc., Seoul (KR)

(72) Inventors: Chul Soo Lee, Seoul (KR); Jong-Yeul Shu, Seoul (KR); Seung Jong Choi, Seoul (KR); Jung Eun Lim, Seoul (KR); Jeong Hyu Yang, Seoul (KR); Jin Seok Im, Seoul (KR); Wern Bae Kil, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 974 days.

(21) Appl. No.: 13/955,913

(22) Filed: Jul. 31, 2013

(65) Prior Publication Data

US 2013/0314499 A1 Nov. 28, 2013
US 2016/0373721 A9 Dec. 22, 2016

Related U.S. Application Data

(63) Continuation of application No. 13/543,268, filed on Jul. 6, 2012, which is a continuation of application (Continued)

(30) Foreign Application Priority Data

Nov. 11, 2008 (KR) .......................... 10-2008-0111648

(51) Int. Cl.
  *H04N 13/02* (2006.01)
  *H04N 13/00* (2006.01)
  (Continued)

(52) U.S. Cl.
  CPC ..... *H04N 13/0062* (2013.01); *H04N 13/0048* (2013.01); *H04N 13/0059* (2013.01); (Continued)

(58) Field of Classification Search
  CPC .......... H04N 13/0048; H04N 13/0059; H04N 13/0062; H04N 13/0066; H04N 13/234327; H04N 13/4345; H04N 13/4382; H04N 13/4621
  See application file for complete search history.

(56) References Cited

U.S. PATENT DOCUMENTS

| 5,555,324 A | 9/1996 | Waxman et al. |
| 5,717,415 A | 2/1998 | Iue et al. |

(Continued)

FOREIGN PATENT DOCUMENTS

| CN | 1301115 | 6/2001 |
| CN | 1613263 A | 5/2005 |

(Continued)

*Primary Examiner* — Nhon Diep
(74) *Attorney, Agent, or Firm* — Dentons US LLP

(57) ABSTRACT

A receiving system and a method of processing data are disclosed herein. The receiving system includes a receiving unit, a system information processor, a decoding unit, and a display unit. The receiving unit receives a broadcast signal including a 3D content and system information associated with the 3D content. The system information processor extracts identification information from the system information. Herein, the identification information may identify that the broadcast signal being received by the receiving unit includes the 3D content. The decoding unit decodes the received 3D content based upon transmission format information of the 3D content. Herein, the transmission format information may be included in the extracted identification information. And, the display unit displays the 3D content decoded by the decoding unit as a 3D image based upon a display method of a display device.

8 Claims, 7 Drawing Sheets

Related U.S. Application Data

No. 12/738,038, filed as application No. PCT/KR2009/005789 on Oct. 9, 2009, now Pat. No. 8,248,461.

(60) Provisional application No. 61/240,657, filed on Sep. 9, 2009, provisional application No. 61/173,196, filed on Apr. 27, 2009, provisional application No. 61/104,274, filed on Oct. 10, 2008.

(51) Int. Cl.
    *H04N 21/2343* (2011.01)
    *H04N 21/434* (2011.01)
    *H04N 21/438* (2011.01)
    *H04N 21/462* (2011.01)
    *H04N 21/81* (2011.01)

(52) U.S. Cl.
CPC . *H04N 13/0066* (2013.01); *H04N 21/234327* (2013.01); *H04N 21/4345* (2013.01); *H04N 21/4382* (2013.01); *H04N 21/4621* (2013.01); *H04N 21/8146* (2013.01); *H04N 2213/003* (2013.01); *H04N 2213/007* (2013.01)

(56) References Cited

U.S. PATENT DOCUMENTS

| | | |
|---|---|---|
| 7,580,178 B2 | 8/2009 | Cho et al. |
| 8,824,820 B2 | 9/2014 | Lee et al. |
| 8,903,227 B2 | 12/2014 | Hamada |
| 2004/0218269 A1 | 11/2004 | Divelbiss et al. |
| 2005/0117637 A1 | 6/2005 | Routhier et al. |
| 2005/0248561 A1 | 11/2005 | Ito et al. |
| 2006/0064716 A1 | 3/2006 | Sull et al. |
| 2006/0192776 A1 | 8/2006 | Nomura et al. |
| 2009/0128620 A1 | 5/2009 | Lipton et al. |
| 2010/0086285 A1* | 4/2010 | Sasaki .................. G11B 27/105 386/212 |
| 2010/0161686 A1 | 6/2010 | Yun et al. |
| 2011/0254917 A1 | 10/2011 | Schaffer et al. |
| 2012/0062711 A1 | 3/2012 | Ikeda et al. |

FOREIGN PATENT DOCUMENTS

| | | |
|---|---|---|
| CN | 1697526 A | 11/2005 |
| CN | 1739304 A | 2/2006 |
| CN | 1954606 | 4/2007 |
| EP | 1501317 A1 | 1/2005 |
| JP | 2004-193673 | 7/2004 |
| JP | 2005006114 A | 1/2005 |
| KR | 10-2007-0058302 | 6/2007 |
| KR | 20070061227 A | 6/2007 |
| KR | 10-2008-0039797 | 5/2008 |
| WO | WO 2007/007923 A1 | 1/2007 |
| WO | 2007064159 A1 | 6/2007 |
| WO | 2007066868 A | 6/2007 |
| WO | WO 2007/067020 A1 | 6/2007 |
| WO | 2008054100 A1 | 5/2008 |

\* cited by examiner

Fig. 2
(a) 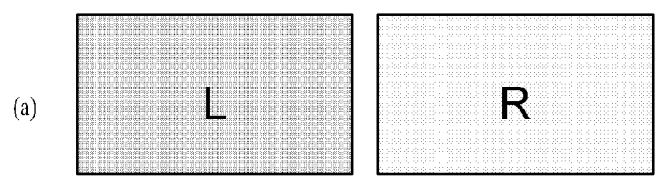
(b) 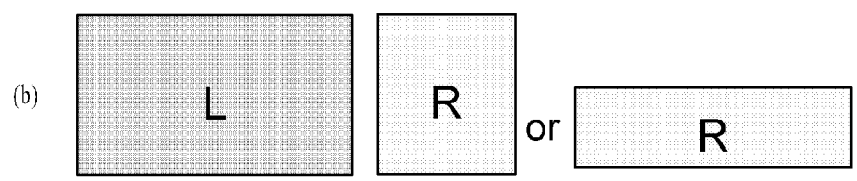
(c) 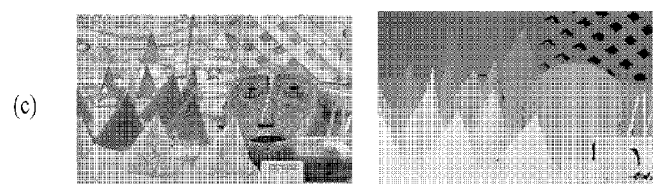

Fig. 3

| Syntax | # of bit |
|---|---|
| TS_Program_map_section(){ | |
|     table_id | 8 |
|     section_syntax_indicator | 1 |
|     '0' | 1 |
|     reserved | 2 |
|     section_length | 12 |
|     program_number | 16 |
|     reserved | 2 |
|     version_number | 5 |
|     current_next_indicator | 1 |
|     section_number | 8 |
|     last_section_number | 8 |
|     reserved | 3 |
|     program info-length | 12 |
|     for(i=0;i<N;i++){ | |
|         descriptor() | |
|     } | |
|     for(i=0;i<N1;i++){ | |
|         stream_type | 8 |
|         reserved | 3 |
|         elementary_PID | 13 |
|         reserved | 4 |
|         ES_info_length | 12 |
|         for(i=0;i<N2;i++){ | |
|             descriptor() | |
|         } | |
|     } | |
|     CRC32 | 32 |
| } | |

Fig. 4

| Syntax |
|---|
| ImageFormat_descriptor () { |
|     descriptor_tag |
|     descriptor_length |
|     3D_image_format_type |
|     LR_first_flag |
|     spatial_flipping_flag |
|     image0_flipped_flag |
|     quincunx_filtering_flag |
| } |

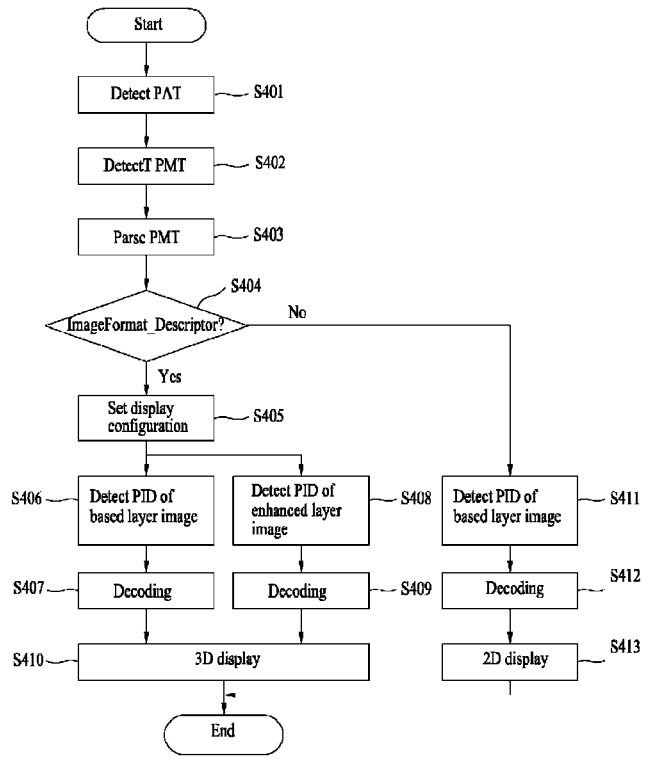

Fig. 7

| Syntax | No. of Bits |
|---|---|
| virtual_channel_table_section(){ | |
|   table_id | 8 |
|   section_syntax_indicator | 1 |
|   Private_indicator | 1 |
|   reserved | 2 |
|   section_length | 12 |
|   transport_stream_id | 16 |
|   reserved | 2 |
|   version_number | 5 |
|   current_next_indicator | 1 |
|   section_number | 8 |
|   last_section_number | 8 |
|   protocol_version | 8 |
|   num_channels_in_section | 8 |
|   for(i=0;i<num_channels_in_section;i++){ | |
|     short_name | 7*16 |
|     reserved | 4 |
|     major_channel_number | 10 |
|     minor_channel_number | 10 |
|     modulation_mode | 8 |
|     carrier_frequency | 32 |
|     channel_TSID | 16 |
|     program_number | 16 |
|     ETM_location | 2 |
|     access_controlled | 1 |
|     hidden | 1 |
|     reserved | 6 |
|     service_type | 6 |
|     source_id | 16 |
|     reserved | 6 |
|     descriptors_length | 10 |
|     for(i=0;i<N;i++){ | |
|       descriptors() | |
|     } | |
|   } | |
|   reserved | 6 |
|   additional_descriptors_length | 10 |
|   for(j=0;j<N;j++){ | |
|     additional_descriptors() | |
|   } | |
|   CRC_32 | 32 |
| } | |

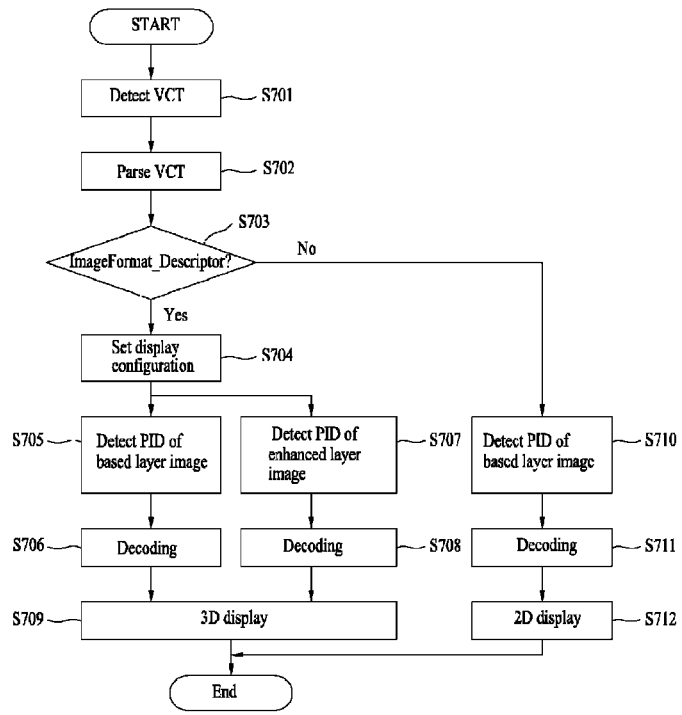

US 9,712,803 B2

RECEIVING SYSTEM AND METHOD OF PROCESSING DATA

This application is a Continuation of application Ser. No. 13/543,268 filed on Jul. 6, 2012, which is a continuation of application Ser. No. 12/738,038 filed on Jul. 9, 2010 and claims the benefit of priority of PCT Application No. PCT/KR2009/005789 filed on Oct. 9, 2009 which claims the benefit of priority of U.S. Provisional Application No. 61/104,274 filed Oct. 10, 2008; U.S. Provisional Application No. 61/240,657 filed Sep. 9, 2009, U.S. Provisional Application No. 61/173,196 filed Apr. 27, 2009 which claims the benefit of priority of Korean Application No. 10-2008-0111648 filed on Nov. 11, 2008, all of which are incorporated by reference in their entirety herein.

TECHNICAL FIELD

The present invention relates to a method and apparatus for processing an image signal and, more particularly, to a receiving system for receiving and processing a 3-dimensional (3D) image signal and a method of processing data.

BACKGROUND ART

Generally, a 3-dimensional (3D) image (or stereoscopic image) is based upon the principle of stereoscopic vision of both human eyes. A parallax between both eyes, in other words, a binocular parallax caused by the two eyes of an individual being spaced apart at a distance of approximately 65 millimeters (mm) is viewed as the main factor that enables the individual to view objects 3-dimensionally. When each of the left eye and the right eye respectively views a 2-dimensional (or flat) image, the brain combines the pair of differently viewed images, thereby realizing the depth and actual form of the original 3D image.

Such 3D image display may be broadly divided into a stereoscopic method, a volumetric method, and a holographic method. For example, a 3D image display device adopting the stereoscopic method corresponds to an image display device that adds depth information to 2D images and that uses such depth information to enable the viewer to experience the dynamic, live, and realistic perception of the 3D image.

Furthermore, the method of displaying 3D images may be broadly divided into a method of wearing special glasses and a method of not wearing any special glasses.

DISCLOSURE OF INVENTION

Technical Problem

Accordingly, the present invention is directed to a receiving system and a method of processing data that substantially obviate one or more problems due to limitations and disadvantages of the related art.

An object of the present invention is to provide a receiving system and a method of processing data that can recognize the reception of a 3D image by the receiving system.

Another object of the present invention is to provide a receiving system and a method of processing data that can enable a receiving system being unable to process 3D images to disregard the reception of any 3D image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a receiving system includes a receiving unit, a system information processor, a decoding unit, and a display unit. The receiving unit receives a broadcast signal including a 3D content and system information associated with the 3D content. The system information processor extracts identification information from the system information. Herein, the identification information may identify that the broadcast signal being received by the receiving unit includes the 3D content. The decoding unit decodes the received 3D content based upon transmission format information of the 3D content. Herein, the transmission format information may be included in the extracted identification information. And, the display unit displays the 3D content decoded by the decoding unit as a 3D image based upon a display method of a display device.

Herein, the identification information may be included in a program map table (PMT) of the system information in a descriptor format.

And, the identification information may be included in a virtual channel table (VCT) of the system information in a descriptor format.

Herein, the identification information may further include a field indicating whether an uppermost pixel of a furthermost left side of a received frame belongs to a left image or to a right image, a field indicating whether at least one of the left image and the right image has been inversely scanned and encoded, a field indicating which of the left image and the right image has been inversely scanned, and a field indicating whether at least one of the left image and the right image used a filter to perform sampling.

The 3D content may include a based layer image and at least one extended (or enhanced) layer image, and the image of each layer may be assigned with a different packet identifier (PID).

Furthermore, the decoding unit may decode the based layer image by referring to the based layer image, and the decoding unit may decode the extended layer image by referring to the based layer image and the at least one extended layer image.

In another aspect of the present invention, a data processing method of a receiving system includes receiving a broadcast signal including a 3D content and system information associated with the 3D content, extracting identification information from the system information, wherein the identification information can identify that the broadcast signal being received includes the 3D content, decoding the received 3D content based upon transmission format information of the 3D content, and displaying the decoded 3D content as a 3D image based upon a display method of a display device.

It is to be understood that both the foregoing general description and the following detailed description of the present invention are exemplary and explanatory and are intended to provide further explanation of the invention as claimed.

Advantageous Effects

The receiving system and the method of processing data have the following advantages. When transmitting a 3D content after differentiating (or identifying) an based layer image and at least one extended layer image of the 3D content, by assigning different packet identifiers (PIDs) for the image of each layer and transmitting the PID-assigned images, the receiving system is capable of accurately identifying the based layer image and the at least one extended layer image based upon the PID.

Also, when using a receiving system that cannot process 3D images, since the receiving system is incapable of recognizing the PID assigned to the extended layer, the conventional receiving system may disregard the reception of the 3D image. Thus, the present invention can be compatible to the conventional receiving system.

Furthermore, by enabling additional information, which is required for identifying and decoding 3D contents, to be acquired by using the identification information included in the system information, the 3D content may be accurately decoded and displayed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates examples of a multi-video stream format among multiple transmission formats for 3D images according to the present invention;

FIG. 3 illustrates a PMT syntax structure including identification information in a descriptor format according to an embodiment of the present invention, wherein the identification information may recognize the reception of a 3D image;

FIG. 4 illustrates a syntax structure of an image format descriptor according to an embodiment of the present invention;

FIG. 5 illustrates a syntax structure of a view descriptor being included and received in the PMT according to an embodiment of the present invention;

FIG. 6 illustrates a flow chart showing the process steps of a receiving system for processing 3D images by using the PMT among diverse system information according to the present invention;

FIG. 7 illustrates a VCT syntax structure including identification information in a descriptor format according to an embodiment of the present invention, wherein the identification information may recognize the reception of a 3D image;

FIG. 8 illustrates a syntax structure of a view descriptor being included and received in the VCT according to an embodiment of the present invention;

FIG. 9 illustrates a flow chart showing the process steps of a receiving system for processing 3D images by using the VCT among diverse system information according to the present invention;

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

The present invention relates to having a receiving system capable of processing 3D images to receive and process a 3D image, by enabling the receiving system to recognize the reception of the 3D image.

The present invention also relates to preventing malfunction in a receiving system incapable of processing 3D images by enabling the receiving system to disregard the reception of any 3D image.

Herein, 3D images may include stereo (or stereoscopic) images, which take into consideration two different perspectives (or viewpoints), and multi-view images, which take into consideration three different perspectives.

A stereo image refers to a pair of left-view and right view images acquired by photographing the same subject with a left-side camera and a right-side camera, wherein both cameras are spaced apart from one another at a predetermined distance. Furthermore, a multi-view image refers to a set of at least 3 images acquired by photographing the same subject with at least 3 different cameras either spaced apart from one another at predetermined distances or placed at different angles.

The transmission formats of stereo images include a single video stream format and a multi-video stream format.

Figure 1:
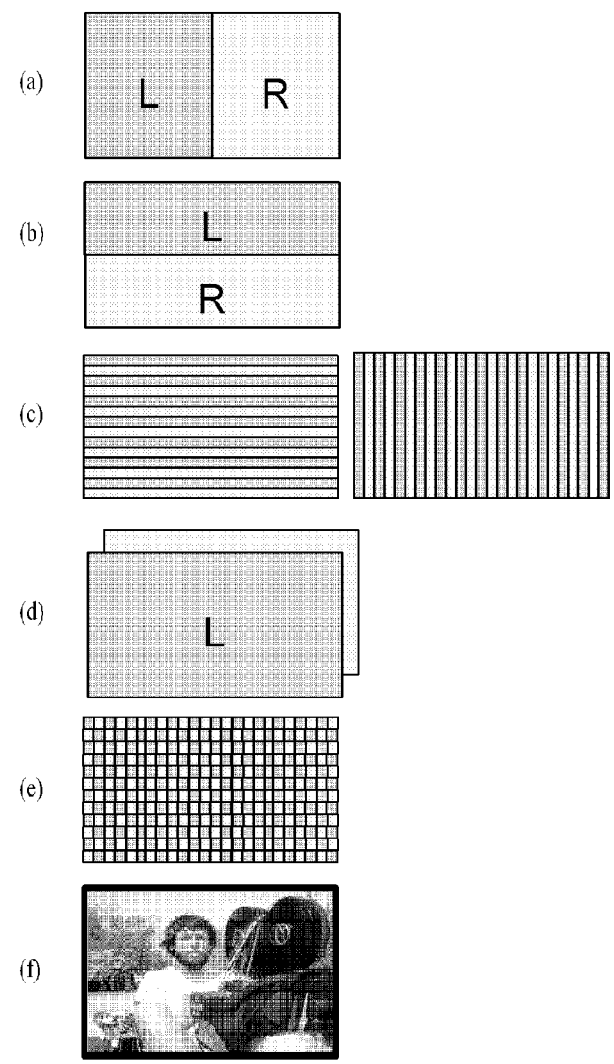
FIG. 1 illustrates examples of a single video stream format among multiple transmission formats for 3D images according to the present invention.

Herein, the single video stream format includes a side-by-side format shown in (a) of FIG. 1, a top/bottom format shown in (b) of FIG. 1, an interlaced format shown in (c) of FIG. 1, a frame sequential format shown in (d) of FIG. 1, a checker board format shown in (e) of FIG. 1, and an anaglyph format shown in (f) of FIG. 1. Also, the multi-video stream format includes a full left/right format shown in (a) of FIG. 2, a full left/half right format shown in (b) of FIG. 2, and a 2D video/depth format shown in (c) of FIG. 2.

For example, the side-by-side format shown in (a) of FIG. 1 corresponds to a case where a left image and a right image are ½ sub-sampled in a horizontal direction. Herein, the sampled left image is positioned on the left side, and the sampled right image is positioned on the right side, thereby creating a single stereo image. The top/bottom format shown in (b) of FIG. 1 corresponds to a case where a left image and a right image are ½ sub-sampled in a vertical direction. Herein, the sampled left image is positioned on the upper side, and the sampled right image is positioned on the lower side, thereby creating a single stereo image.

The interlaced format shown in (c) of FIG. 1 corresponds to a case where a left image and a right image are ½ sub-sampled in a horizontal direction. Herein, pixels of the sampled left image and pixels of the sampled right image are alternated line by line, thereby creating a single stereo image. Alternatively, a left image and a right image are ½ sub-sampled in a horizontal direction, and pixels of the sampled left image and pixels of the sampled right image are alternated pixel by pixel (i.e., in single pixel units), thereby creating a single stereo image. The checker board format shown in (e) of FIG. 1 corresponds to a case where a left image and a right image are ½ sub-sampled in both horizontal and vertical directions. Herein, pixels of the sampled left image and pixels of the sampled right image are alternated in single pixel units, thereby creating a single stereo image.

Furthermore, the full left/right format shown in (a) of FIG. 2 corresponds to a case where a left image and a right image are sequentially transmitted. The full left/half right format shown in (b) of FIG. 2 corresponds to a case where the left image remains in its original state, and where the right image is ½ sub-sampled either in a horizontal direction or in a vertical direction. Finally, the 2D video/depth format shown in (c) of FIG. 2 corresponds to a case where one of the left image and the right image is transmitted, and where depth information for creating another image is also transmitted at the same time.

At this point, the stereo image or the multi-view image is compression encoded in MPEG format or by using diverse methods, thereby being transmitted to the receiving system.

For example, a stereo image of the side-by-side format, the top/bottom format, the interlaced format, the frame sequential format, the checker board format, and the anaglyph format may be compression-encoded by using the H.264/AVC (Advanced Video Coding) method, so as to be transmitted. At this point, the receiving system performs a decoding process on the stereo image as an inverse process for the H.264/AVC method, thereby acquiring a 3D image.

Furthermore, the left image of the full left/half right format and any one of the multi-view image may be allocated as a based layer image, and the remaining image may be allocated as an extended (or enhanced) layer image. Thereafter, the image of the based layer may be encoded by using the same method used for encoding a monoscopic image. And, in the iamge of the extended layer, only the correlation information between the based layer image and the extended layer image may be encoded. Subsequently, the processed images may be transmitted. Examples of the compression-encoding methods for the based layer image may include JPEG, MPEG-1, MPEG-2, MPEG-4, and H.264/AVC. And, in this embodiment of the present invention, the H.264/AVC method has been adopted. Furthermore, according to the embodiment of the present invention, a H.264/MVC (Multi-view Video Coding) method has also been adopted for the compression-encoding process of the extended layer image.

At this point, the stereo image is allocated to a based layer image and a single extended layer image. However, the multi-view image is allocated to a single based layer image and multiple extended layer images. The standard for identifying (or differentiating) the multi-view image as the based layer image and at least one extended layer image may either be decided based upon the position of each camera or be decided based upon an alignment form of the camera (or cameras). Furthermore, the standard may also be decided arbitrarily without following any specific standard. Herein, the based layer image may also be referred to as a base view, and the extended layer image may also be referred to as a non-base view.

More specifically, when a reference picture is required for compression-encoding, the based layer image refers to at least one of the pictures of the based layer so as to perform compression-encoding. For example, in case of picture B of the based layer, reference is made to at least one of picture I, picture P, and picture B of the based layer so as to perform compression-encoding. Furthermore, when a reference picture is required for compression-encoding, the extended layer image refers to at least one of the pictures of the based layer so as to perform compression-encoding. At this point, further reference may be made to pictures of the corresponding extended layer or to pictures of another extended layer, thereby performing compression-encoding. For example, when a multi-view image is divided into a based layer image, an image of the first extended layer, and an image of the second extended layer, each of the based layer and the first and second extended layers corresponds to a different view (or viewpoint).

As described above, when the based layer image is compression-encoded by using the H.264/AVC method, and when the extended layer image is compression-encoded by using the H.264/MVC method, thereby being received, the receiving system may perform a decoding process on the based layer image by using only the based layer pictures. Conversely, the extended layer image cannot be decoded by using only the extended layer pictures. More specifically, without information on the based layer image, the extended layer image cannot be normally decoded.

At this point, when the receiving system decoded only the based layer image, a general (or regular) 2D image may be acquired. And, when the based layer image and at least one extended layer image are collectively decoded, a 3D image may be acquired.

Therefore, in case of a receiving system that can process 3D images, the receiving system should be capable of recognizing the reception of a 3D image. Also, since a 3D image may be transmitted in diverse formats, the receiving system should also be informed of the transmission format of the corresponding 3D image that is being received, in order to decode the compression-encoded 3D image to its initial state. Furthermore, a receiving system incapable of processing 3D images should be disregarded the reception of any 3D image.

Accordingly, by enabling the receiving system that can process 3D images to recognize the reception of a 3D image, the present invention can enable the receiving system to receive and process 3D images.

The present invention also relates to preventing malfunction in a receiving system incapable of processing 3D images, by enabling the receiving system to disregard the reception of any 3D image.

According to an embodiment of the present invention, in a receiving system that can process 3D images, identification information enabling the receiving system to recognize the reception of a 3D image is included in the system information, thereby being received by the receiving system. In some cases, the system information may also be referred to as service information. Herein, the system information may include channel information, program information, event information, and so on.

According to the embodiment of the present invention, a program specific information/program and system information protocol (PSI/PSIP) is adopted as the system information. However, the present invention wil not be limited only to this example. In other words, any protocol that transmits system information in a table format may be applied in the present invention regardless of the name of the corresponding protocol.

The PSI table is an MPEG-2 system standard defined for dividing (or categorizing) channels and programs. The PSIP table is an advanced television systems committee (ATSC) standard that can enable the division (or identification or categorization) of the channels and the programs. According to an embodiment of the present invention, the PSI table may include a program association table (PAT), a conditional access table (CAT), a program map table (PMT), and a network information table (NIT).

Herein, the PAT corresponds to special information that is transmitted by a data packet having a PID of '0'. The PAT transmits PID information of the corresponding PMT and PID information of the corresponding NIT for each program. The CAT transmits information on a paid broadcasting system used by a transmitting system. The PMT transmits PID information of a transport stream (TS) packet, in which program identification numbers and individual bit sequences of video and audio data configuring the corresponding program are transmitted, and also transmits the PID information in which PCR is transmitted. The NIT transmits information of the actual transmission network. For example, by parsing a PAT table having the PID of '0', a program number and a PID of the PMT may be found (or acquired). Then, by parsing the PMT acquired from the PAT, the correlation between the elements configuring the corresponding program may also be acquired (or found).

According to an embodiment of the present invention, the PSIP table may include a virtual channel table (VCT), a system time table (STT), a rating region table (RRT), an extended text table (ETT), a direct channel change table (DCCT), an event information table (EIT), and a master guide table (MGT).

The VCT transmits information on virtual channels, such as channel information for selecting channels and information such as packet identification (PID) numbers for receiving the audio and/or video data. More specifically, when the VCT is parsed, the PID of the audio/video data of the broadcast program may be known. Herein, the corresponding audio/video data are transmitted within the channel along with the channel name and channel number. The STT transmits information on the current data and timing information. The RRT transmits information on region and consultation organs for program ratings. The ETT transmits additional description of a specific channel and broadcast program. The EIT transmits information on virtual channel events (e.g., program title, program start time, etc.). The DCCT/DCCSCT transmits information associated with automatic (or direct) channel change. And, the MGT transmits the versions and PID information of the above-mentioned tables included in the PSIP.

According to an embodiment of the present invention, the identification information for recognizing the reception of a 3D image is included and received in the system information in at least one descriptor format or field format.

According to an embodiment of the present invention, the identification information is included and received in the PMT of the system information in a descriptor format.

According to another embodiment of the present invention, the identification information is included and received in the VCT of the system information in a descriptor format.

Herein, the identification information may include at least one or more information associated with 3D images. More specifically, the identification information may include 3D image format type information, view (or viewpoint) identification information, a number of views referred to for the decoding process, and sampling time difference information between the views.

FIG. 3 illustrates a PMT syntax structure including identification information in a descriptor format according to an embodiment of the present invention, wherein the identification information can recognize the reception of a 3D image.

Referring to FIG. 3, a table_id field corresponds to a table identifier. Herein, an identifier that identifies the PMT may be set as the table_id field.

A section_syntax_indicator field corresponds to an indicator defining a section format of the PMT.

A section_length field indicates the section length of the PMT.

A program_number field corresponds to information matching with the PAT. Herein, the program_number field indicates the number of the corresponding program.

A version_number field indicates a version number of the PMT.

A current_next_indicator field corresponds to an indicator indicating whether the current table section is applicable or not.

A section_number field indicates the section number of the current PMT section, when the PMT is divided into at least one or more sections, thereby being transmitted.

A last_section_number field indicates the last section number of the corresponding PMT.

A PCR_PID field indicates the PID of a packet that delivers a program clock reference (PCR) of the current program.

A program_info_length field indicates length information of a descriptor immediately following the program_info_length field in number of bytes. More specifically, the program_info_length field indicates the length of each descriptor included in a first loop.

A stream_type field indicates a type of element stream and encoding information included in a packet having the PID value marked in an elementary_PID field that follows.

The elementary_PID field indicates an identifier of the element stream, i.e., the PID value of a packet including the corresponding element stream.

An ES_info_length field indicates the length information of a descriptor immediately following the ES_info_length field in number of bytes. More specifically, the ES_info_length field indicates the length of each descriptor included in a second loop.

According to the present invention, descriptors of a program level are included in the descriptor( ) region within the first loop of the PMT, and descriptors of a stream level are included in the descriptor( ) region within the second loop of the PMT. More specifically, the descriptors included in the first loop correspond to descriptors that are individually applied to each program, and the descriptors included in the second loop correspond to descriptors that are individually applied to each ES.

According to an embodiment of the present invention, when a program corresponding to the program_number field value of the PMT is a 3D content, an identification information, which is capable of identifying (or verifying) the reception of a 3D image, is included in the descriptor( ) region of the first loop in a descriptor format. In the description of the present invention, this descriptor will be referred to as an image format descriptor ImageFormat_descriptor( ).

More specifically, when the image format descriptor ImageFormat_descriptor( ) is included in the PMT, thereby being received, the receiving system determines that the program corresponding to the program information of the PMT is a 3D content.

FIG. 4 illustrates a syntax structure of an image format descriptor ImageFormat_descriptor( ) according to an embodiment of the present invention.

A descriptor_tag field indicates that the corresponding descriptor is the ImageFormat_descriptor( ).

A descriptor_length field indicates the byte size (or length) starting from after the descriptor_length field to the end of the descriptor ImageFormat_descriptor( ).

A 3D_Image_format_type field indicates by which transmission format the corresponding 3D content has been received.

Herein, the 3D_Image_fommat_type field indicates by which of the transmission formats, i.e., the side-by-side format, the top/bottom format, the interlaced format, the frame sequential format, the checker board format, the anaglyph format, the full left/right format, the full left/half right format, and the 2D video/depth format, the corresponding 3D image has been received. For example, when the image format descriptor ImageFormat_descriptor( ) is included in the PMT and the received, the receiving system determines that the program corresponding to the program information of the PMT is a 3D content. Thereafter, when the 3D_Image_format_type field value of the ImageFormat_descriptor( ) is equal to '001', the receiving system may determines that the corresponding 3D content has been received in a side-by-side format.

An LR_first_flag field indicates, when generating a stereo image (or when multiplexing a stereo image), whether the uppermost pixel of the furthermost left side of the frame belongs to the left image, or whether the uppermost pixel of the furthermost left side of the frame belongs to the right image. More specifically, the LR_first_flag field indicates whether to display the furthermost left side of the received frame as the left image, or whether to display the furthermost left side of the received frame as the right image. According to an embodiment of the present invention, if the value of the LR_first_flag field is equal to '0', the furthermost left side of the frame is displayed as the left image. And, if the value of the LR_first_flag field is equal to '1', the furthermost left side of the frame is displayed as the right image.

For example, when the transmission format is a side-by-side format, and if the value of the LR_first_flag field is equal to '0', the receiving system decodes the pixels of the left-side half of a frame and displays the decoded pixels as the left image. And, the receiving system decodes the pixels of the right-side half of the frame and displays the decoded pixels as the right image. Conversely, when the transmission format is a side-by-side format, and if the value of the LR_first_flag field is equal to '1', the receiving system decodes the pixels of the left-side half of a frame and displays the decoded pixels as the right image. And, the receiving system decodes the pixels of the right-side half of the frame and displays the decoded pixels as the left image.

As another example, when the transmission format is a top/bottom format, and if the value of the LR_first_flag field is equal to '0', the receiving system decodes the pixels of the upper half of a frame and displays the decoded pixels as the left image. And, the receiving system decodes the pixels of the lower half of the frame and displays the decoded pixels as the right image. Conversely, when the transmission format is a top/bottom format, and if the value of the LR_first_flag field is equal to '1', the receiving system decodes the pixels of the upper half of a frame and displays the decoded pixels as the right image. And, the receiving system decodes the pixels of the lower half of the frame and displays the decoded pixels as the left image.

A spatial_flipping_flag field indicates whether at least one of the left image and the right image is inversely scanned and encoded. When the transmitting system encodes a stereo image consisting of a left image and a right image, the transmitting system scans the image by inversing (or flipping) the scanning direction of at least one of the left and right images, so as to enhance the coding efficiency. More specifically, depending upon the scanning efficiency, inverse scanning (or alignment) may be performed on the left or right image in a vertical or horizontal direction. The inversely-scanned images will hereinafter be referred to as mirrored images for simplicity.

According to an embodiment of the present invention, when the transmission format is a side-by-side format, the present invention performs inverse scanning on the left or right image in a horizontal direction, thereby encoding the inversely-scanned image. And, when the transmission format is a top/bottom format, the present invention performs inverse scanning on the left or right image in a vertical direction, thereby encoding the inversely-scanned image. According to the embodiment of the present invention, in this case, the spatial_flipping_flag field is marked to have the value of '1'. If the spatial_flipping_flag field value is equal to '1', prior to displaying the mirrored images, the receivined system inversely aligns the mirrored images in the initial (or original) scanning order, thereby displaying the aligned images. On the other hand, when the spatial_flipping_flag field value is equal to '0', this indicates that the pixels of the left and right image are aligned in the initial scanning order, thereby being encoded.

When the spatial_flipping_flag field value is equal to '1', an image0_flipped_flag field indicates which image has been flipped (or mirrored or inverted). According to the embodiment of the present invention, if image0 is flipped, then the image0_flipped_flag field value is equal to '1'. And, if image1 is flipped, the image0_flipped_flag field is equal to '0'. Herein, image0 corresponds to an image having the uppermost pixel of the furthermost left side of a frame, which consists of left and right images, belonging thereto. And, image1 corresponds to the other image. More specifically, the mapping relation between image0 and image1 and the left or right image is set based upon the LR_first_flag field. If the LR_first_flag field is equal to '0', the left image corresponds to image0 and the right image corresponds to image1.

A quincunx_filtering_flag field indicates whether a quincunx filter has been used to perform sampling, when generating the stereo image. According to an embodiment of the present invention, when the transmitting system samples a left image or a right image to a half-resolution image, and if the quincunx filter has been used for the sampling process, the quincunx_filtering_flag field is marked to have the value of Otherwise, the quincunx_filtering_flag field is marked to have the value of '0'. Herein, if the quincunx_filtering_flag field is equal to '1', the receiving system performs an inverse process of quincunx filtering on the corresponding image. For example, in case of the side-by-side format, the top/bottom format, and the full left/half right format, when ½-sub-sampling the left or right image in a horizontal or vertical direction, and if the quincunx filter has been used, the quincunx_filtering_flag field is marked to have the value of '1'. According to another embodiment of the present invention, in case of the side-by-side format, the top/bottom format, and the full left/half right format, when ½-subsampling the left or right image in a horizontal or vertical direction, a filter other than the quincunx filter may be used. For this case, the present invention may further include a field indicating the type of filter used herein.

As described above, when the receiving system recognizes the image format descriptor, and when the receiving system supports the transmission format indicated by the value of the 3D_image_format_type field within the image format descriptor, the corresponding 3D content may be decoded by referring to other fields included in the image format descriptor. Meanwhile, in case of the conventional receiving system that is incapable of processing 3D images, since the receiving system is unable to recognize the image format descriptor, the corresponding receiving system can perform decoding only on 2D images. For example, if an image format descriptor is not included in a PMT that is being received, the corresponding ES may be decoded by using the same method as the conventional method for decoding 2D images.

Moreover, according to an embodiment of the present invention, when it is assumed that a 3D image is transmitted by being divided into a based layer image and at least one extended layer image (i.e., a non-base view image), different packet identifiers (PIDs) are allocated to each layer, thereby configuring respective elementary streams (ESs), which are then transmitted.

For example, when it is assumed that a 3D image is divided into a based layer, a first extended layer, and a second extended layer, the PID value being inserted in the header of a stream packet including the ES of the based layer, the PID value being inserted in the header of a stream packet including the ES of the first extended layer, and the PID value being inserted in the header of a stream packet including the ES of the second extended layer are different from one another. More specifically, different PIDs are allocated for each view (or viewpoint).

According to the embodiment of the present invention, the stream packet is configured of a header and a payload. Herein, the header is assigned with 4 bytes, and the payload is assigned with 184 bytes. Since the number of bytes that are to be assigned to the header and payload of the stream packet may vary depending upon the design of the system designer, the present invention will not be limited only to the exemplary numbers given in the description of the present invention set forth herein.

Furthermore, according to an embodiment of the present invention, when the based layer (i.e., base view) image is compression-encoded by using the H.264/AVC method, it is indicated in the value of the stream_type field corresponding to the ES of the based layer, that the respective ES has been compression-encoded by using the H.264/AVC method. Also, when the extended layer (i.e., non-base view) image is compression-encoded by using the H.264/MVC method, it is indicated in the value of the stream_type field corresponding to the ES of the extended layer, that the respective ES has been compression-encoded by using the H.264/MVC method.

According to an embodiment of the present invention, the stream_type field corresponding to the ES of the based layer is assigned with the value of '0xB1', and the stream_type field corresponding to the ES of the extended layer is assigned with a value other than '0xB1', such as '0xB2'.

In this case, by parsing the stream_type field, the receiving system may acquire encoding information of the corresponding ES. And, by referring to the acquired encoding information, the receiving system may perform a decoding process on the corresponding ES.

Additionally, according to an embodiment of the present invention, when the 3D image is divided into a based layer image and an extended layer image, and when the image of the extended layer has been compression-encoded by using the H.264/MVC method, a view (or viewpoint) information required for decoding the extended layer image is included in the second loop of the PMT in a field format or a descriptor format, thereby being received.

Herein, the view information may include identification information that can identify (or differentiate) each view (or viewpoint), and reference view identification information required for decoding the ES corresponding to current view.

According to the embodiment of the present invention, the view information is included in the second loop of the PMT in a descriptor format, thereby being received. In the description of the present invention, this descriptor will be referred to as a view descriptor PMT_view_descriptor( ) for simplicity. In this case, the view descriptor PMT_view_descriptor( ) is individually applied to each ES.

More specifically, when the view descriptor is included and received in the PMT, the receiving system may acquire view information required for decoding the corresponding ES.

FIG. 5 illustrates a syntax structure of a view descriptor PMT_view_descriptor( ) being included and received in the PMT according to an embodiment of the present invention.

A descriptor_tag field indicates that the corresponding descriptor is the PMT_view descriptor( ).

A descriptor_length field indicates the byte size (or length) starting from after the descriptor_length field to the end of the descriptor PMT_view_descriptor( ).

A view_id field indicates view identification information (i.e., view id) of an ES that is being delivered through the corresponding PID.

A number_of_reference_view field indicates a number of views that had been referred to when encoding was performed on the image of the view corresponding to the view_id field.

A reference_view_id field indicates identification information of views that had been repeatedly referred to, as many times as the number_of_reference_view field value, when encoding was performed on the image of the view corresponding to the view_id field.

More specifically, in order to decode the extended layer image by using the H.264/MVC method, the ES of the corresponding view as well as the ES of a different view may be required. In order to do so, the number_of_reference_view field transmits the number of referred views, and the reference_view_id field transmits view identification information corresponding to the number of views that are repeatedly referred to as many times as the number_of_reference_view field value.

A time_difference_between_base_view field indicates a sampling time difference that may occur between views. For example, if the display method is a shutter glass method, the 3D image is realized by sequentially displaying the left image and the right image. At this point, a difference may occur between the sampling time for the left and right images and the time both left and right images are recognized (or identified) by the human eyes. Thus, a distortion may occur due to a change in depth with the eye when the image is moving. Therefore, the present invention uses the time_difference_between_base_view field to indicate the difference in sampling time that may occur between views. The value of the time_difference_between_base_view field may be used by the receiving system to compensate the above-described distortion.

If the image of a view corresponding to the view_id field corresponding to a based layer image, the value of the number_of_reference_view field and the value of the time_difference_between_base_view field are marked as '0'.

The order, position, and definition of the fields allocated to the view descriptor PMT_view_descriptor( ) shown in FIG. 5, are merely examples presented to facilitate and simplify the understanding of the present invention. In other words, the order, position, and definition of the fields allocated to the view descriptor PMT_view_descriptor( ) and the number of fields that can be additionally allocated thereto may be easily altered or modified by the system designer. Therefore, the present invention will not be limited to the examples given in the above-described embodiment of the present invention.

FIG. 6 illustrates a flow chart showing the process steps of a receiving system for processing 3D images by using the PMT among diverse system information according to the present invention. For example, in case of a 3D image, it is assumed that the 3D image is divided intro a based layer and at least one extended layer each having a PID different from one another. Herein, it is also assumed that the extended layer image is compression-encoded by using the H.264/MVC method, thereby being received.

More specifically, in order to provide 3D image service, the receiving system finds a PAT having a PID of '0' (i.e., PID=0) from an inputted bit stream (S401). Then, the receiving system acquires a PID of the PMT from the PAT and gathers (or collects) stream packets having the acquired PIDs of the PMT, thereby configuring the PMT (S402). Subsequenity, the PMT is parsed (S403), so that the receiving system can verify whether or not the image format descriptor ImageFormat_descriptor( ) is included and received in the first loop of the descriptor( ) within the PMT (S404).

At this point, when the image format descriptor ImageFormat_descriptor( ) is detected from the PMT, the receiving system determines that the program corresponding to the program number of the PMT is a 3D content. If the image format descriptor ImageFormat descriptor( ) is not detected from the PMT, the receiving system determines that the program corresponding to the program number of the PMT is a 2D content. When it is determined in step 404 that the corresponding program is a 2D content, the receiving system uses the corresponding ES information of the second loop within the PMT, so as to extract the PID corresponding to the 2D content (S411). Subsequenity, the receiving system performs decoding on the stream packets corresponding to the extracted PID (S412). According to an embodiment of the present invention, the 2D conent is compression-decoded by using an inverse method of the H.264/AVC compression-encoding method.

The 2D content decoded in step 412 is displayed on the display device as a 2D image (S413).

Meanwhile, when it is determined in step 404 that the corresponding program is a 3D content, the receiving syste sets up a configuration for the display based upon the fields included in the image format descriptor (S405). Then, the receiving system extracts a PID corresponding to the ES of the based layer in the second loop of the PMT (S406). Subsequently, the receiving system performs decoding on the stream packets corresponding to the extracted PID, thereby recovering the initial (or original) image (S407). For example, if the based layer image was the left image, after the decoding process, the corresponding image is recovered to the left image prior to being processed with compression-encoding. According to an embodiment of the present invention, the ES of the based layer is decoded as an inverse method of the H.264/AVC compression-encoding method.

Subsequently, the receiving system extracts a PID corresponding to the ES of the extended layer from the second loop of the PMT (S408). Thereafter, the receiving system performs decoding on the stream packets corresponding to the extracted PID, thereby recovering the initial (or original) image (S409). For example, if the extended layer image was the right image, after the decoding process, the corresponding image is recovered to the right image prior to being processed with compression-encoding. According to an embodiment of the present invention, the ES of the extended layer is decoded as an inverse method of the H.264/MVC compression-encoding method.

If the 3D image has multiple extended layers due to being a multi-view image, step 408 and step 409 are repeated as many times as the number of extended layers, thereby recovering the image of all extended layers. At this point, when the view descriptor is included in the PMT, the receiving system refers to the view information acquired by parsing the view descriptor, thereby being capable of decoding the extended layer image.

When the based layer image is recovered by processing step 407, and when the extended layer image is recovered by processing step 409, the recovered based layer image and at least one of the recovered extended layer image are used so as to display the 3D image on the display device in accordance with the respective display method (S410). More specifically, by using at least two images based upon the characteristics of the display device, the receiving system creates and displays a 3D image using a variety of methods. For example, the display method may include a method of wearing special glasses, and a method of not wearing any glasses.

The method of wearing special glasses is then divided intro a passive method and an active method. The passive method corresponds to a method of showing the 3D image by differentiating the left image and the right image using a polarizing filter. More specifically, the passive method corresponds to a method of wearing a pair of glasses with one red lens and one blue lens fitted to each eye, respectively. The active method corresponds to a method of differentialting the left image and the right image by sequentially covering the left eye and the right eye at a predetermined time interval. More specifically, the active method corresponds to a method of periodically repeating a time-split (or time-divided) and viewing the corresponding image through a pair of glasses equipped with electronic shutters which are synchronized with the time-split cycle period of the image. The active method may also be referred to as a time-split method or a shuttered glass method.

The most well-known methods of not wearing any glasses include a lenticular method and a parallax barrier method. Herein, the lenticular method corresponds to a method of fixing a lenticular lens panel in front of an image panel, wherein the lenticular lens panel is configured of a cynlindrical lens array being vertically aligned. The parallax method corresponds to a method of providing a barrier layer having periodic slits above the image panel. Meanwhile, the identification information that can recognize the reception of 3D images according to the present invention (i.e., the image format descriptor shown in FIG. 4) may be included in the VCT, thereby being received.

FIG. 7 illustrates a VCT syntax structure including identification information in a descriptor format according to an embodiment of the present invention, wherein the identification information may recognize the reception of a 3D image.

Referring to FIG. 7, a table_id field corresponds to a table identifier. Herein, an identifier that identifies the VCT may be set as the table_id field.

A section_syntax_indicator field corresponds to an indicator defining a section format of the VCT.

A section_length field indicates the section length of the VCT.

A transport_stream_id field is identical to a transport stream ID included in a program association table (PAT) having a PID value of '0'.

A version_number field indicates a version number of the VCT.

A current_next_indicator field corresponds to an indicator indicating whether the current table section is applicable or not.

A section_number field indicates the section number of the current VCT section, when the VCT is divided into at least one or more sections, thereby being transmitted.

A last_section_number field indicates the last section number of the corresponding VCT. And, a num_channels_in_section field designates a total number of virtual channels existing in the VCT section.

The VCT syntax further includes a first repetition statement, 'for' loop which is repeated as many times as the num_channels_in_section field value. The first repetition statement may include a short_name field, a major_channel_number field, a minor_channel_number field, a modulation_mode field, a carrier_frequency field, a channel_TSID field, a program_number field, an ETM_location field, an access_controlled field, a hidden field, a service_type field, a source_id field, a descriptor_length field, and a second repetition statement, 'for' loop which is repeated as many times as the number of descriptors included in the first repetition statement. In the description of the present invention, the second repetition statement will be referred to as a first descriptor loop for simplicity. The descriptor descriptors( ) included in the first descriptor loop is separately applied to each virtual channel.

In the first repetition statement, the short_name field indicates the name of a virtual channel. The major_channel_number field indicates a 'major' channel number associated with the virtual channel defined within the first repetition statement, and the minor_channel_number field indicates a 'minor' channel number. More specifically, each of the channel numbers should be connected to the major and minor channel numbers, and the major and minor channel numbers are used as user reference numbers for the corresponding virtual channel.

The program_number field is shown for connecting the virtual channel having an MPEG-2 program association table (PAT) and program map table (PMT) defined therein, and the program_number field matches the program number within the PAT/PMT. Herein, the PAT describes the elements of a program corresponding to each program number, and the PAT indicates the PID of a transport packet transmitting the PMT. The PMT describes subordinate information and also a PID list of the transport packet through which a program identification number and a separate bit sequence, such as video and/or audio data configuring the program, are being transmitted.

Furthermore, the VCT syntax may further include an additional_descriptor_length field, and a third repetition statement, 'for' loop which is repeated as many times as the number of descriptors additionally added to the VCT. In the description of the present invention, the third repetition statement will be referred to as a second descriptor loop for simplicity. The descriptor additional_descriptors( ) included in the second descriptor loop is commonly applied to all virtual channels described in the VCT.

The image format descriptor according to the present invention may be included in the first descriptor loop of the VCT shown in FIG. 7.

When the program corresponding to the program_number field value of the VCT is a 3D content, the present invention may include and transmit an image format descriptor, which can verify that a 3D image is being received, in a descriptor( ) region of the first descriptor loop included in the VCT. According to an embodiment of the present invention, the syntax structure of the image format descriptor ImageFormat_descriptor( ) and the description of each field are identical as those shown in FIG. 4.

For example, when the image format descriptor is included and received in the VCT, the receiving system determines that the program corresponding to the program information of the VCT is a 3D content. Also, when the value of the 3D_Image_format_type field within the image format descriptor is equal to '001', the receiving system may determine that the corresponding 3D content is being received in the side-by-side format.

More specifically, when the receiving system recognizes the image format descriptor, and when the receiving system supports the transmission format designated by the value of the 3D_Image_format_type field within the image format descriptor, the receiving system may decode the corresponding 3D content. Meanwhile, if the receiving system corresponds to the conventional receiving system that is incapable of processing 3D images, since the receiving sysem is unable to recognize the image format descriptor, the receiving system may perform decoding only on 2D images. For example, if the image format descriptor is not included in the VCT that is currently being received, the corresponding ES may be decoded by using the same method for decoding the conventional 2D content.

Furthermore, according to an embodiment of the present invention, when the 3D image is divided into a based layer image and an extended layer image, and when the extended layer image is encoded by using the H.264/MVC method, a view information required for decoding the extended layer image is included and received in the first descriptor loop of the VCT in a descriptor format.

The view information may include identification information that can identify (or differentiate) each view (or viewpoint), and reference view identification information, which is required for decoding the ES corresponding to the current view.

In the description of the present invention, the above-described descriptor will be referred to as a view descriptor VCT_view_descriptor( ) for simplicity. In this case, the view descriptor is individually applied to each ES. More specifically, if the view descriptor is included and received in the VCT, the receiving system may acquire view information required for decoding the corresponding ES.

FIG. 8 illustrates a syntax structure of a view descriptor VCT_view_descriptor( ), which is included and received in the VCT according to an embodiment of the present invention.

A descriptor_tag field indicates that the corresponding descriptor is the VCT_view_descriptor( ).

A descriptor_length field indicates the byte size (or length) starting from after the descriptor_length field to the end of the descriptor VCT_view_descriptor( ).

A stream_type field indicates the types of element streams and encoding information included in the packet having the PID value marked in the elementary_PID field that follows.

Herein, according to an embodiment of the present invention, when the based layer (i.e., base view) image is compression-encoded by using the H.264/AVC method, it is indicated in the value of the stream_type field corresponding to the ES of the based layer, that the respective ES has been compression-encoded by using the H.264/AVC method. Also, when the extended layer (i.e., non-base view) image is compression-encoded by using the H.264/MVC method, it is indicated in the value of the stream_type field corresponding to the ES of the extended layer, that the respective ES has been compression-encoded by using the H.264/MVC method. In this case, by parsing the stream_type field, the receiving system may acquire encoding information of the corresponding ES. And, by referring to the acquired encoding information, the receiving system may perform a decoding process on the corresponding ES.

The elementary_PID field indicates indicates an identifier of the element stream, i.e., the PTD value of the packet including the corresponding element stream.

A view_id field indicates view identification information (i.e., view id) of an ES that is being delivered through the corresponding PID.

A number_of_reference_view field indicates a number of views that had been referred to when encoding was performed on the image of the view corresponding to the view_id field.

A reference_view_id field indicates an identification information of views that had been repeatedly referred to, as many times as the number_of_reference_view field value, when encoding was performed on the image of the view corresponding to the view_id field. More specifically, in order to decode the extended layer image by using the H.264/MVC method, the ES of the corresponding view as well as the ES of a different view may be required. In order to do so, the number_of_reference_view field transmits the number of referred views, and the reference_view_id field transmits view identification information corresponding to the number of views that are repeatedly referred to as many times as the number_of_reference_view field value.

A time_difference_between_base_view field indicates a sampling time difference that may occur between views. For example, if the display method is a shutter glass method, the 3D image is realized by sequentially displaying the left image and the right image. At this point, a difference may occur between the sampling time for the left and right images and the time both left and right images are recognized (or identified) by the human eyes. Thus, a distortion may occur due to a change in depth with the eye when the image is moving. Therefore, the present invention uses the time_difference_between_base_view field to indicate the difference in sampling time that may occur between views. The value of the time_difference_between_base_view field may be used by the receiving system to compensate the above-described distortion.

If the image of a view corresponding to the view_id field corresponding to a based layer image, the value of the number_of_reference_view field and the value of the time_difference_between_base_view field are marked as '0'.

The order, position, and definition of the fields allocated to the view descriptor VCT_view_descriptor( ), shown in FIG. 8, are merely examples presented to facilitate and simplify the understanding of the present invention. In other words, the order, position, and definition of the fields allocated to the view descriptor VCT_view_descriptor( ) and the number of fields that can be additionally allocated thereto may be easily altered or modified by the system designer. Therefore, the present invention will not be limited to the examples given in the above-described embodiment of the present invention.

FIG. 9 illustrates a flow chart showing the process steps of a receiving system for processing 3D images by using the VCT among diverse system information according to the present invention. For example, in case of a 3D image, it is assumed that the 3D image is divided intro a based layer and at least one extended layer each having a PID different from one another. Herein, it is also assumed that the extended layer image is compression-encoded by using the H.264/MVC method, thereby being received.

More specifically, in order to provide 3D image service, the receiving system configures a VCT from the received stream through a table identifier (S701). Then, the receiving system parses the configured VCT (S702). Subsequently, the receiving system verifies whether the image format descriptor ImageFormat_descriptor( ) is included and received in the first descriptor of the VCT (S703).

At this point, when the image format descriptor ImageFormat_descriptor( ) is detected from the VCT, the receiving system determines that the program corresponding to the program number of the VCT is a 3D content. If the image format descriptor ImageFormat_descriptor( ) is not detected from the VCT, the receiving system determines that the program corresponding to the program number of the VCT is a 2D content. When it is determined in step 703 that the corresponding program is a 2D content, the receiving system uses the corresponding ES information of a service location descriptor service_location_descriptor( ) within the VCT, so as to extract the PID corresponding to the 2D content (S710). Subsequenity, the receiving system performs decoding on the stream packets corresponding to the extracted PID (S711). According to an embodiment of the present invention, the 2D conent is compression-decoded by using an inverse method of the H.264/AVC compression-encoding method. The 2D content decoded in step 711 is displayed on the display device as a 2D image (S712).

Meanwhile, when it is determined in step 703 that the corresponding program is a 3D content, the receiving syste sets up a configuration for the display based upon the fields included in the image format descriptor (S704). Then, the receiving system extracts a PID corresponding to the ES of the based layer in the service location descriptor service_location_descriptor( ) of the first descriptor loop within the VCT (S705). Subsequently, the receiving system performs decoding on the stream packets corresponding to the extracted PID, thereby recovering the initial (or original) image (S706). For example, if the based layer image was the left image, after the decoding process, the corresponding image is recovered to the left image prior to being processed with compression-encoding. According to an embodiment of the present invention, the ES of the based layer is decoded as an inverse method of the H.264/AVC compression-encoding method.

Subsequently, the receiving system extracts a PID corresponding to the ES of the extended layer from the service location descriptor service_location_descriptor( ) of the first descriptor loop within the VCT (S707). Thereafter, the receiving system performs decoding on the stream packets corresponding to the extracted PID, thereby recovering the initial (or original) image (S708). For example, if the extended layer image was the right image, after the decoding process, the corresponding image is recovered to the right image prior to being processed with compression-encoding.

According to an embodiment of the present invention, the ES of the extended layer is decoded as an inverse method of the H.264/MVC compression-encoding method.

If the 3D image has multiple extended layers due to being a multi-view image, step 707 and step 708 are repeated as many times as the number of extended layers, thereby recovering the image of all extended layers. At this point, when the view descriptor is included in the VCT, the receiving system refers to the view information acquired by parsing the view descriptor, thereby being capable of decoding the extended layer image.

When the based layer image is recovered by processing step 706, and when the extended layer image is recovered by processing step 708, the recovered based layer image and at least one of the recovered extended layer image are used so as to display the 3D image on the display device in accordance with the respective display method (S709). More specifically, by using at least two images based upon the characteristics of the display device, the receiving system creates and displays a 3D image using a variety of methods. For example, the display method may include a method of wearing special glasses, and a method of not wearing any glasses.

Figure 10:
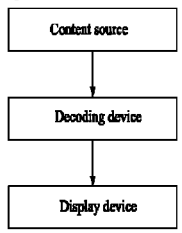
FIG. 10 illustrates a general diagram of a 3D imaging system according to an embodiment of the present invention.

FIG. 10 illustrates a general diagram of a 3D imaging system according to an embodiment of the present invention. Herein, the 3D imaging system may include a content source, a decoding device, and a display device. The content source includes 3D contents for 3D (or 3-dimensional) imaging. For example, the content source may correspond to a disc, an internet server, terrestrial/satellite/cable broadcast stations, and so on. The decoding device receives a content from the content source and decodes the received content, so as to create an image that is to be displayed. For example, when the received content is compression-encoded, the decoding device performs decompression and/or interpolation processes, thereby recovering the original image. Examples of the decoding device mayinclude a disc player, an IPTV settop box, and a television (TV) that shows terrestrial, satellite, and cable broadcast programs.

The display device displays the image created in the decoding device in a 2D or 3D format. Examples of the display device may include a device that can display general 2D images, a device that can display 3D images requiring special viewing glasses, and a device that can display 3D images without requiring any special viewing glasses.

According to an embodiment of the present invention, when a 3D image is realized by parsing an image format descriptor and a view descriptor from the PMT, process steps excluding step 410 and step 413 are processed in the decoding device, and step 410 and step 413 processed in the display device.

According to another embodiment of the present invention, when a 3D image is realized by parsing an image format descriptor and a view descriptor from the VCT, process steps excluding step 709 and step 712 are processed in the decoding device, and step 709 and step 712 are processed in the display device.

For example, it is assumed that the value of the 3D_image_format_type field acquired from the image format descriptor included in the PMT or VCT indicates the side-by-side transmission format, that the LR_first_flag field value is equal to '0', that the spatial_flipping_flag field value is equal to '1', that the image0_flipped_flag field value is equal to '0', and that the quincunx_filtering_flag is equal to '1'. In this case, it can be known that the uppermost pixel of the furthermost left side of the received frame belogs to the left image, that the right image has been inversely scanned during the encoding process, and that a quincunx filter has been used when sampling the left and right images. Therefore, the decoding device scans the right image in an inversed direction and decodes the inversely-scanned image. At this point, the corresponding image is recovered to its initial image size by being processed with an inverse process of the quincunx filter or with an andequate inversed filtering process. The display device displays image recovered by decoding the right-side half of the pixels as left image. Also, the display device displays image recovered by decoding the right-side half of the pixels as the right image.

In the description of the present invention, the decoding device and the display device will be collectively referred to as a receiving system for simplicity.

Herein, the receiving system may be configured of the decoding device and the display device, both parts being separable (i.e., the decoding device being detachably fixed to the display device). Alternatively, the receiving system may be configured as a single body consisting of the decoding device and the display device.

Figure 11:
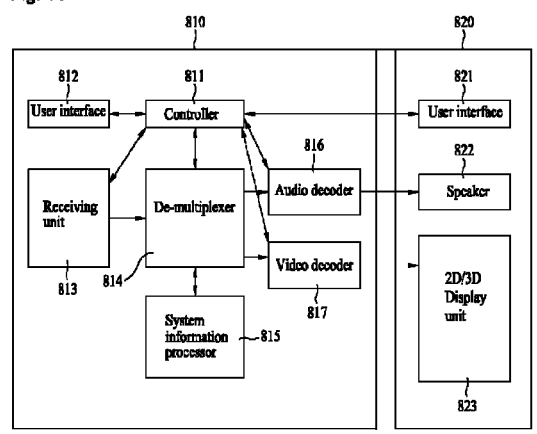
FIG. 11 illustrates a block diagram showing a structure of a receiving system configured of a decoding device detachably fixed to a display device according to an embodiment of the present invention.

FIG. 11 illustrates a block diagram showing a structure of a receiving system configured of a decoding device detachably fixed to a display device according to an embodiment of the present invention.

More specifically, the decoding device 810 may include a controller 811, a user interface 812, a receiving unit 813, a demultiplexer 814, a system information processor 815, an audio decoder 816, and a video decoder 817. The display device 820 may include a user interface 821, a speaker 822, and a 2D/3D display unit 823.

A 2D image or 3D image content transmitted from the content source and a system information required for decoding the 2D image or 3D image are received in the receiving unit 813. Then, when a specific reception-requested channel is selected by using the user interface 812, the controller 811 controls the receiving unit 813 so that only the 2D image or 3D image of the corresponding channel can be received. At this point, in case of the 3D image, a stream corresponding to each view (or viewpoint) is PES-packetized, thereby being received in a TS packet format having a separate PID. For example, a based layer image and at least one extended layer image are each assigned with a different PID, thereby being received.

The receiving unit 811 performs demodulation and channel-equalization processes on the 2D image or 3D image of the specific channel, thereby outputting the processed image to the demultiplexer 814 in a stream format. The system information received by the receiving unit 811 is also outputted to the demultiplexer 814 in a stream format.

The demultiplexer 814 refers to the PID of each stream. Then, the demultiplexer 814 outputs the audio stream to the audio decoder 816 and outputs the video stream to the video decoder 817. Thereafter, the demultiplexer 814 outputs the system information to the system information processor 815.

At this point, a system time clock (STC), a decoding time stamp (DTS), and a presentation time stamp (PTS) are multiplexed in the stream being inputted to the demultiplexer 814. Herein, the decoding time stamp (DTS) indicates when to decode each picture based upon the STC. The presentation time stamp (PTS) indicates when to display the decoded data based upon the STC. More specifically, the STC corresponds to an overall clock that is locked with a video encoder of the transmitting system. Herein, the video encoder and the video decoder have the same STC. And, since a video signal is internally delayed in the video encoder, in order to perform A/V lipsynchronization and a normal video decoding process, the video decoder generates a DTS and a PTS based upon the STC, which are then collectively transmitted.

Therefore, for the synchronization between each view (or viewpoint), the demultiplexer 814 recovers the STC, which is a reference standard for the DTS and the PTS, from the stream based upon the control of the controller 811. Thereafter, the demultiplexer 814 outputs the recovered STC to the video decoder 817.

A method identifying reception of a 3D image based upon the PMT will now be described as follows.

More specifically, the system information processor 815 finds a PAT having a PID of '0' (i.e., PID=0) from a system information stream. Then, the system information processor 815 acquires a PID of the PMT from the PAT and gathers (or collects) stream packets having the acquired PIDs of the PMT, thereby configuring the PMT. Subsequenity, the system information processor 815 parses the PMT, so that the system information processor 815 can verify whether or not the image format descriptor ImageFormat_descriptor( ) is included and received in the first loop of the descriptor( ) within the PMT.

At this point, when the image format descriptor Image-Format_descriptor( ) is detected from the PMT, the system information processor 815 determines that the program corresponding to the program number of the PMT is a 3D content. Alternatively, if the image format descriptor Image-Format_descriptor( ) is not detected from the PMT, the system information processor 815 determines that the program corresponding to the program number of the PMT is a 2D content.

Therefore, if the image format descriptor ImageFormat_ descriptor( ) is not detected from the PMT, the system information processor 815 uses the ES information corresponding to the second loop of the PMT to extract the PID corresponding to the 2D content. Subsequently, the system information processor 815 outputs the extracted PID to the demultiplexer 814. The demultiplexer 814 respectively outputs the audio stream and the video stream, each corresponding to the inputted PTD, to the audio decoder 816 and the video decoder 817.

For example, the video decoder 817 performs decoding, as an inverse method of the H.264/AVC compression-encoding method, on the inputted video stream, thereby outputting the processed video stream to the 2D/3D display unit 823. The 2D/3D display unit 823 displays the decoded video stream to the display device as a 2D image.

Meanwhile, when the image format descriptor ImageFormat_descriptor( ) is detected from the PMT, the system information processor 815 extracts a PID corresponding to the ES of the based layer from the second loop of the PMT, thereby outputting the extracted PID to the demultiplexer 814. The demultiplexer 814 respectively outputs the audio stream and the video stream, each corresponding to the inputted PID, to the audio decoder 816 and the video decoder 817.

For example, if the based layer image was the left image, after performing a decoding process in the video decoder 817, the corresponding image is recovered to the left image prior to being processed with compression-encoding. According to an embodiment of the present invention, the ES of the based layer is decoded as an inverse method of the H.264/AVC compression-encoding method.

Furthermore, the system information processor 815 extracts a PID corresponding to the ES of the based layer from the second loop of the PMT, thereby outputting the extracted PID to the demultiplexer 814. The demultiplexer 814 respectively outputs the audio stream and the video stream, each corresponding to the inputted PID, to the audio decoder 816 and the video decoder 817. At this point, the system information processor 815 extracts a PID corresponding to the ES of the based layer from the second loop of the PMT, thereby outputting the extracted PID to the demultiplexer 814. For example, if the extended layer image was the right image, after performing a decoding process in the video decoder 817, the corresponding image is recovered to the right image prior to being processed with compression-encoding. According to an embodiment of the present invention, the ES of the extended layer is decoded as an inverse method of the H.264/MVC compression-encoding method.

If the 3D image has multiple extended layers due to being a multi-view image, the system information processor 815 extracts a corresponding PID as many times as the number of extended layers. Then, by outputting the extracted PIDs to the demultiplexer 814, a multi-view image may be recoeved in the video decoder 817. At this point, when the view descriptor is included in the PMT, the receiving system refers to the view information acquired by parsing the view descriptor, thereby being capable of decoding the extended layer image.

The 2D/3D display unit 823 uses the based layer image and at least one of the extended layer image recovered in the video decoder 817, so as to display the 3D image on the display device in accordance with the respective display method. More specifically, by using at least two images based upon the characteristics of the display device, the 2D/3D display unit 823 creates and displays a 3D image using a variety of methods. For example, the display method may include a method of wearing special glasses, and a method of not wearing any glasses.

Figure 12:
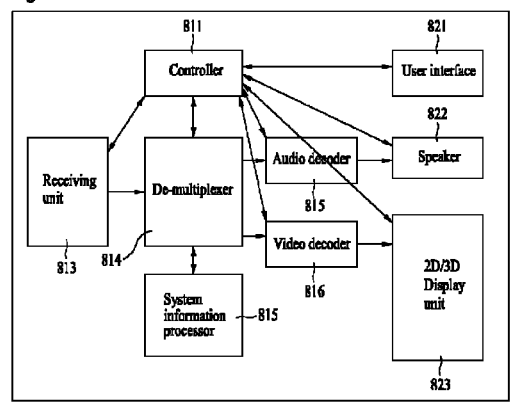
FIG. 12 illustrates a block diagram showing a structure of a receiving system configured of a decoding device non-separably fixed to a display device according to an embodiment of the present invention.

FIG. 12 illustrates a block diagram showing a structure of a receiving system configured of a decoding device non-separably fixed to a display device (i.e., the receiving system being configured as a single body consisting of a decoding device and a display device) according to an embodiment of the present invention. The same reference numerals used for indicating the blocks having the same structure and functions as those shown in FIG. 11 will be given to the elements shown in FIG. 12. In this case, since reference may be made to FIG. 11 for the detailed operation of each block, detailed description of the same will be omitted in FIG. 12 for simplicity.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

MODE FOR THE INVENTION

Meanwhile, the mode for the embodiment of the present invention is described together with the 'best Mode' description.

INDUSTRIAL APPLICABILITY

The embodiments of the method for transmitting and receiving signals and the apparatus for transmitting and receiving signals according to the present invention can be used in the fields of broadcasting and communication.

The invention claimed is:

1. A transmitting system comprising:
a generator configured to generate program elements for a 3-dimensional (3D) content including stereo images or multi-view images, and generate signaling information of the program elements;
a multiplexer configured to multiplex the program elements and the signaling information; and
a transmitter configured to transmit the multiplexed the program elements and the signal information,
wherein the signaling information includes first table information providing a correspondence between a program number and a packet identifier (PID) of transport stream (TS) packets which carries the program elements, and second table information mapping between program numbers and the program elements,
wherein the second table comprises a stream type specifying a type of a video stream carried within the TS packets, an elementary packet identifier specifying an elementary PID of the TS packets which carry the video stream,
wherein the second table information includes a first descriptor,
wherein the first descriptor includes type information indicating by which transmission format the 3D content has been transmitted,
wherein the transmission format includes a single video stream format and a multi video stream format,
wherein the first descriptor further includes at least one information flag which is used to decode a 3D content having a transmission format of the single video stream format,
wherein the second table information includes a second descriptor when the type information indicates the transmission format of the 3D content being multi video stream format, and
wherein the second descriptor includes a view identifier (ID) and reference information indicating identification information of views that has been referred when encoding was performed on an image of the view corresponding to the view ID.

2. The transmitting system of claim 1, wherein the second descriptor further includes time reference information indicating a sampling time difference between views included in the 3D content.

3. The transmitting system of claim 1, wherein the first descriptor includes a flipping information flag indicating whether at least one of the left image data and right image data is inversely scanned and encoded.

4. The transmitting system of claim 1, wherein the first descriptor includes a filtering information flag indicating whether a quincunx filter is used to perform sampling of the 3D content.

5. A method of transmitting data in a transmitting system, the method comprising:
generating program elements for a 3-dimensional (3D) content including stereo images or multi-view images, and generate signaling information of the program elements;
multiplexing the program elements and the signaling information; and
transmitting the multiplexed the program elements and the signal information,
wherein the signaling information includes first table information providing a correspondence between a program number and a packet identifier (PID) of transport stream (TS) packets which carries the program elements, and second table information mapping between program numbers and the program elements,
wherein the second table comprises a stream type specifying a type of a video stream carried within the TS packets, an elementary packet identifier specifying an elementary PID of the TS packets which carry the video stream,
wherein the second table information includes a first descriptor,
wherein the first descriptor includes type information indicating by which transmission format the 3D content has been transmitted,
wherein the transmission format includes a single video stream format and a multi video stream format,
wherein the first descriptor further includes at least one information flag which is used to decode a 3D content having a transmission format of the single video stream format,
wherein the second table information includes a second descriptor when the type information indicates the transmission format of the 3D content being multi video stream format, and
wherein the second descriptor includes a view identifier (ID) and reference information indicating identification information of views that has been referred when encoding was performed on an image of the view corresponding to the view ID.

6. The method of claim 5, wherein the second descriptor further includes time reference information indicating a sampling time difference between view included in the 3D content.

7. The method of claim 5, wherein the first descriptor includes a flipping information flag indicating whether at least one of the left image data and right image data is inversely scanned and encoded.

8. The method of claim 5, wherein the second table further first descriptor includes a filtering information flag indicating whether a quincunx filter is used to perform sampling of the 3D content.

* * * * *